United States Patent [19]

Kessler

[11] 4,449,877
[45] May 22, 1984

[54] PEG FOR ENGAGEMENT IN COUNTERSUNK SECTION OF A BORE

[75] Inventor: Juergen Kessler, Stuttgart, Fed. Rep. of Germany

[73] Assignee: Hilti Aktiengesellschaft, Fed. Rep. of Germany

[21] Appl. No.: 142,256

[22] Filed: Apr. 21, 1980

[30] Foreign Application Priority Data

May 2, 1979 [DE] Fed. Rep. of Germany ....... 2917611

[51] Int. Cl.³ ........................ F16B 13/00; F16B 13/08
[52] U.S. Cl. ........................................ 411/57; 411/72; 411/182
[58] Field of Search ................... 411/57, 71, 73, 72, 411/74, 60, 177, 182, 63; 175/230

[56] References Cited

U.S. PATENT DOCUMENTS

| 702,255 | 6/1902 | Stockman | 411/60 |
| 1,470,858 | 10/1923 | Maxwell | 411/57 X |
| 2,379,786 | 7/1945 | Bugg et al. | 411/57 |
| 2,448,351 | 8/1948 | Brush | 411/57 |
| 2,470,924 | 5/1949 | Flogaus | 411/57 |
| 2,561,433 | 7/1951 | Uhle | 411/57 |
| 2,649,884 | 8/1953 | Westover | 411/182 |
| 3,122,049 | 2/1964 | Dieterich et al. | 411/57 |
| 4,135,432 | 1/1979 | Schalge et al. | 411/57 |

FOREIGN PATENT DOCUMENTS 618489 2/1949 United Kingdom .................. 411/57

*Primary Examiner*—Gary L. Smith
*Assistant Examiner*—Neill Wilson

*Attorney, Agent, or Firm*—Toren, McGeady and Stanger

[57] ABSTRACT

The disclosure relates to a one-piece masonry dowel, pin or peg (10) for fitted implantation in a bore having an internal enlargement (24), a tool (31) for and method of making the enlargement (24), and a tool for implanting the peg in the bore. The peg (10') consists of a sleeve (11) with internal threading (21) for a fastening screw, the leading part (14) of this sleeve having a plurality of thickened segments of a cylinder separated by axial slots, and the outer diameter of the cylinder made up of these segments being variable in such a way that the sleeve can be pushed into a bore and snapped into an enlargement in this bore. The leading part (14) of the sleeve (11) is integrally provided at the end thereof which leads in the push-in direction with an extension (19) which is likewise divided longitudinally into segments and the outer diameter of which in its relaxed condition corresponds to that of the unslotted annular part (12) of the sleeve (11). Internal threading (21) is provided in the zone of the leading part (14) and the extension (19).

The tool (31) for forming an enlargement or countersink in the bore has rotatable cutter blades (33) for making the enlargement (24), these being secured at the leading end of the tool to axially immobile and radially resilient arms (32) which can be moved out under axial pressure on a rotary spindle (44) of the tool in such a way that an inner expander element (48) is axially movable between them. The tool for implanting the peg has a leading end formed with steps to carry and insert the sleeve in the bore.

2 Claims, 14 Drawing Figures

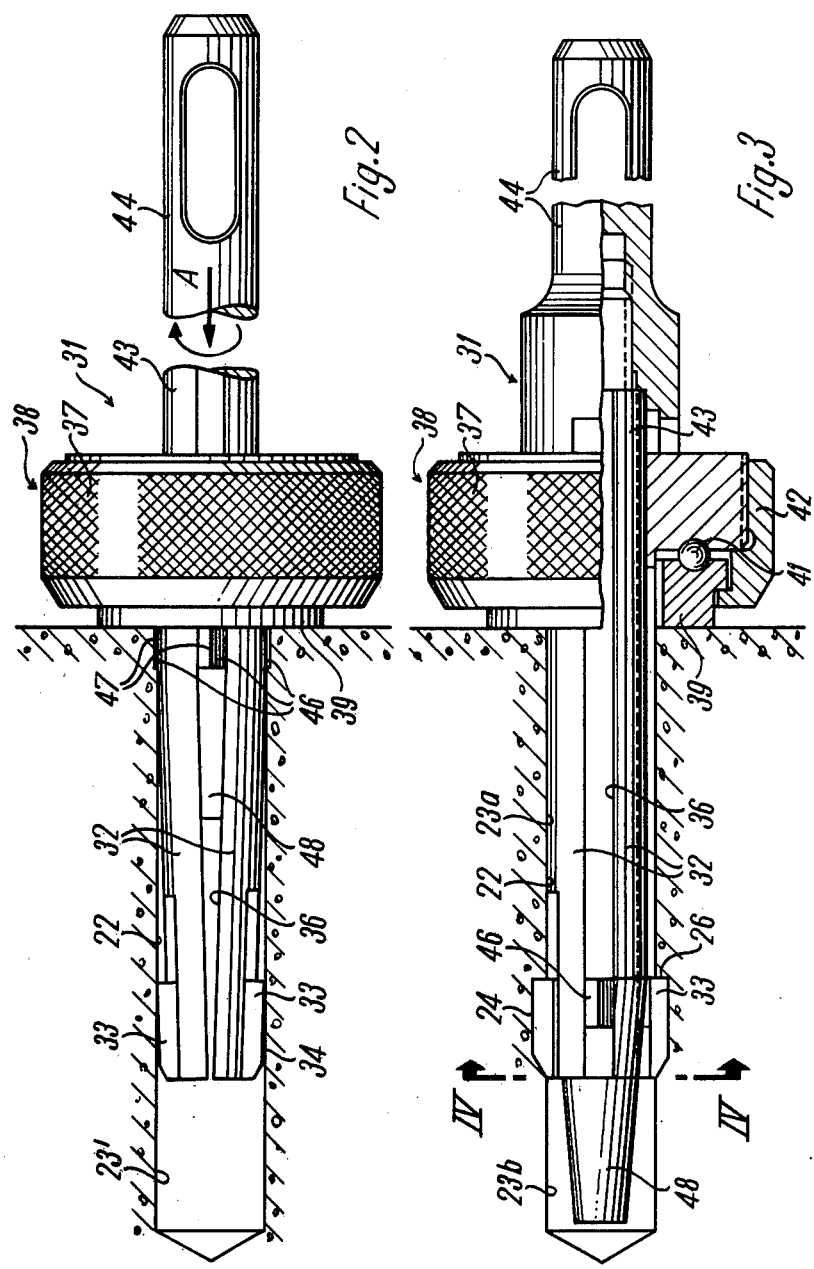

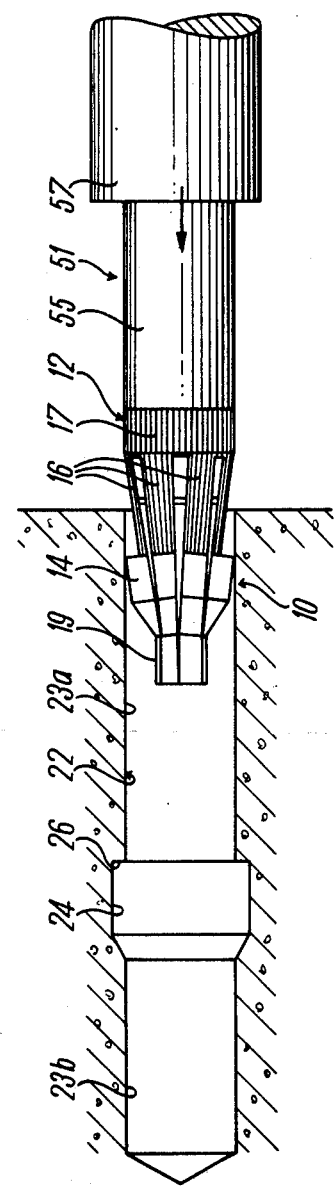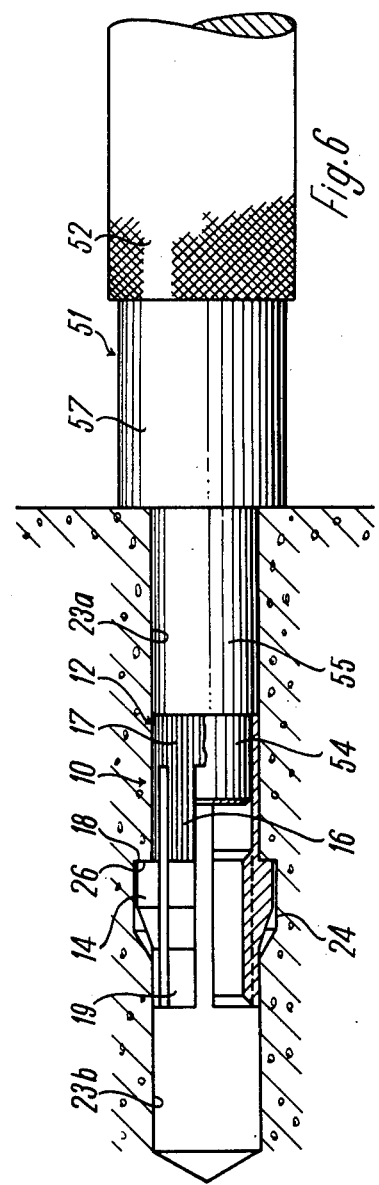

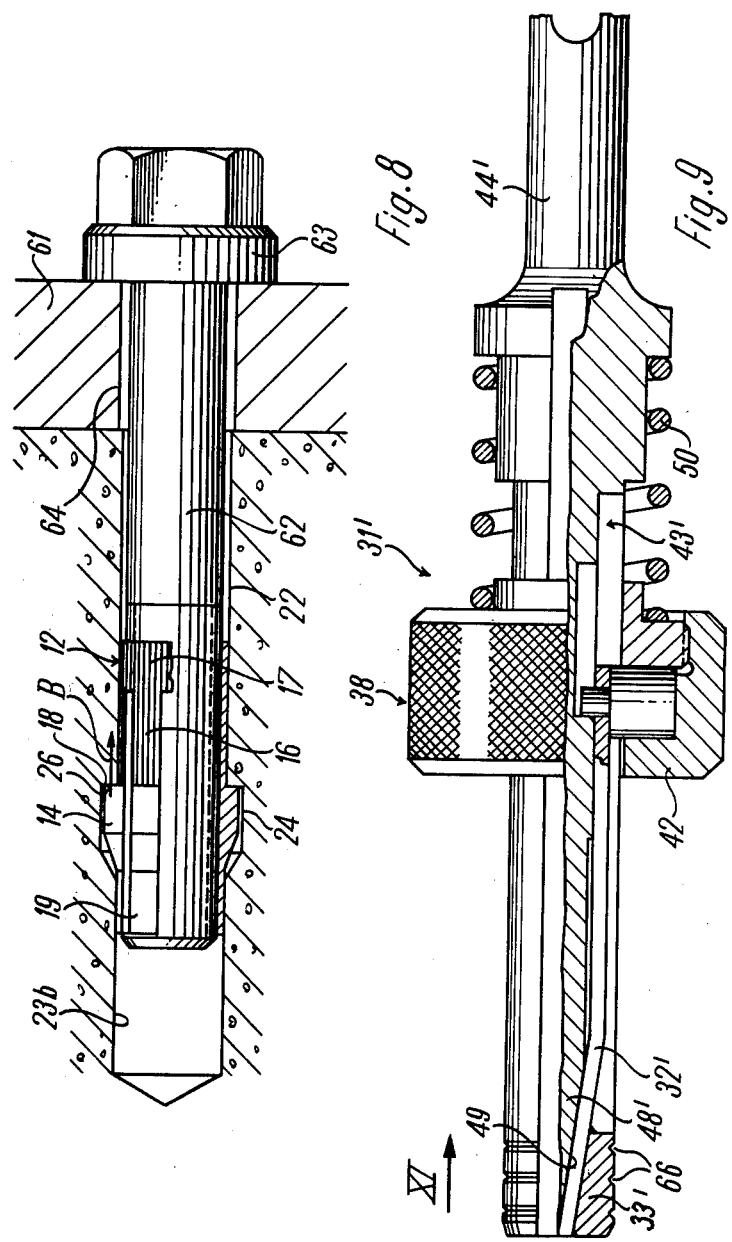

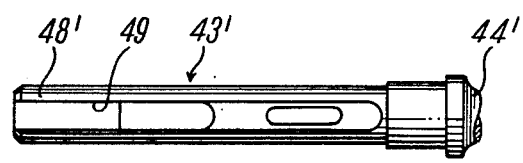
Fig. 10
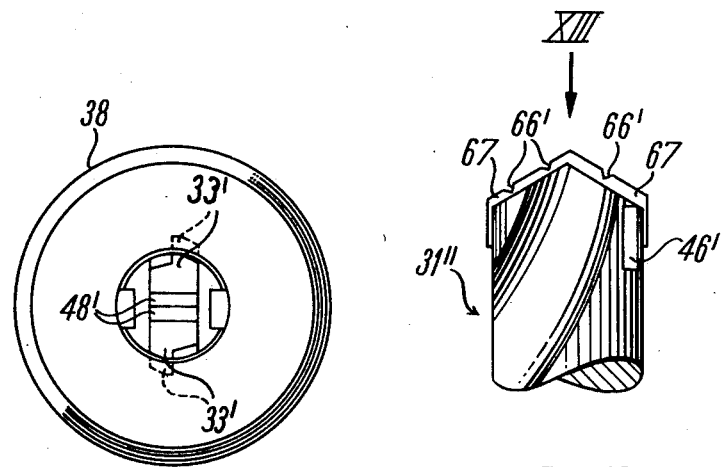
Fig. 11
Fig. 12
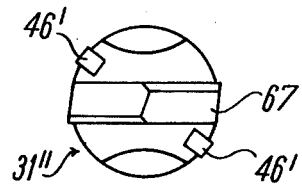
Fig. 13

PEG FOR ENGAGEMENT IN COUNTERSUNK SECTION OF A BORE

The present invention relates to a dowel, pin or peg, hereinafter defined as "peg", used for purposes of fastening in or on masonry, brickwork and the like, a tool for and a method of making a bore for the peg, and a tool for implanting the peg.

Pegs of the kind set forth are known in multiple forms and for many uses, but can be divided into two main categories. The first category concerns those pegs which can be used to hold an object in masonry exclusively by force, achieved by the radial enlargement of lugs of the peg by threading-in of a screw. Such pegs have to be exposed to a considerable radial stress which is a multiple of the axial load which can be taken by the peg. Such force-fitted pegs are practically useless for setting directly at the corner of a masonry structure, a concrete wall or the like because this involves the danger that the corner will rupture.

Pegs have therefore been developed for interfitting in a corresponding enlargement countersunk in the hole or bore, thereby avoiding expansion pressure, as for example is disclosed in DE-OS No. 25 35 066. In this peg the segments are separate parts linked at one end to an annular part provided with internal threading, the linking being such that the segments are not able to drop out of the annular part. The relaxed condition of the segments, in which these have at least at one end a larger diameter than the annular part, is produced by spring elements which press the segments radially outwards. This type of spreading of the segments produces a conical arrangement, the annular part provided with the internal threading being arranged either behind (FIG. 12) or at the front as regarded in the direction of insertion of the peg into the bore.

The disadvantages of this latter form of peg, which dispenses with spreading under pressure are on the one hand the multiplicity of parts and the consequent increased manufacture and assembly costs and, on the other hand, the possibility that the segments may be incorrectly fitted into the enlargement in the bore without this being noticed, if for example the springy element is weak or breaks because the fastening screw does not penetrate successfully in the longitudinal zone of the segments or, when the segments are compressed together, still finds space between these.

The object of the present invention is therefore to provide a peg for fitted implantation into a countersunk bore which is of substantially simpler form and can therefore be made more inexpensively and which is more secure in use. This object is met by a peg as herein defined for implantation in a bore in masonry, brickwork and the like, which bore is provided internally with a radial enlargement, this peg comprising a sleeve having inner threading for a fastening screw and comprising a leading part longitudinally slotted to provide a plurality of segments separated by axial slots and having a greater outer diameter, in its relaxed condition, than an adjoining non-slotted trailing annular part of the sleeve, this diameter being variable to enable the segments to be pushed into the bore and snapped into the enlargement in the latter to inhibit withdrawal of the peg from the bore, characterised by the fact that the annular trailing part and the leading part of the sleeve are integral and the leading part is provided externally and segmentally with a radial thickening, that the leading part of the sleeve is provided integrally at the end thereof which leads in the push-in direction with an extension which also is segmented by longitudinal slotting, the outer diameter of such extension being equal to that of the annular trailing part in the relaxed condition, and that the said inner threading is provided in the zone of the leading part and the extension of the sleeve which, in its relaxed condition, is of substantially the same inner diameter over its complete length.

Thus the invention achieves the result of a simple manufacture in which the sleeve is integral and the segmented leading part has a radial thickening and is resiliently connected to the ring part because of the integral formation. This therefore intrinsically provides a possibility for the variation of the outer diameter of the leading part of the peg sleeve and does not call for an additional element for this purpose. Increased security is to be found in the fact that the fastening screw is connected with the peg sleeve in the zone of the leading part and of the extension, and the fact that the extension which bears against the inner wall of the basic bore prevents any further expansion of the leading part. In other words the simple fitting (absence of spreader pressure) in the enlargement in the bore is produced in one direction (inwards) in such a way that the fastening screw can be threaded between the segments of the leading part and in the other direction (outwardly) as a result of the fact that the extension is present.

DE-OS No. 26 15 016 discloses a peg in which the annular part and the leading part of the peg sleeve are integral and the leading part is provided externally and in segmental fashion with a radial thickening, but this peg does not cater for a fitted or spreader-stress-free insertion in a bore which is provided with a countersunk recess. In contrast in this known peg the enlargement of the segmented leading part by means of a spreader cone results in cutting of the leading part segments into the inner wall of the basic bore which at this time has no enlargement. This known form of spreader peg has moreover the disadvantage that an additional element, namely a spreader cone, is required.

To produce the conically enlarged bore for the peg of the first-named type the aforesaid specification DE-OS No. 25 35 066 discloses a tool in which a cutter blade is arranged at the leading end of a radially-sprung or movable element. A cutter blade is here provided at a part of the periphery of the spindle of the boring tool which is introduced into the basic bore with a slight curvature. Thereupon a sleeve, in which the boring spindle is guided and is in the basic bore, is moved into this basic bore for making the enlargement of the latter, so that the bore spindle is set straight and the cutter blade for making the enlargement is able to cut into the inner wall of this basic bore. What is of disadvantage here is that practically one cutter blade only can be fastened to the boring spindle. This is a drawback not only in relation to the rapidity of the production of the enlargement in the bore, but in respect of the wear of the cutter blade.

In the present invention we provide a tool for making a substantially cylindrical and coaxial enlargement in a cylindrical basic bore for a peg, comprising at least one rotationally driven cutter blade for producing the enlargement in the bore, which cutter blade is secured at the leading end of the tool to an axially immobile, radially springy element which can be diverted in the radial direction under axial pressure on the rotating stem of the tool, characterised by the fact that the radially resilient element is constituted by two or more longitudinal arms which are of segmented circular form in cross section, each of said arms carrying at its leading end a primary cutter blade and the inner relative spacing of which is diminished towards the primary cutter blades, and that an inner spreader element is axially movable between the arms.

This tool of the present invention overcomes the drawbacks mentioned above by the fact that the radially springy element is not constituted by the driven spindle itself but by a plurality of segmental arms on the ends of each of which is a cutter blade. These arms or cutter blades are forced outwardly by an inner spreader cone which is axially movable. A plurality of blades, for example 2, 4, 6 or even more, can be provided depending on the diameter of bore required, which means not only a more rapid production of the enlargement of the bore but also a longer useful life, that is to say a longer period of sharpness of the cutter blades.

Further, in accordance with the invention the basic bore may be produced by a rock drill and the finishing to correct dimensions of this bore is carried out immediately following the production of the basic bore.

It is to be noted that the invention also includes a tool for implanting the peg in its bore, this tool comprising a mandrel the leading end of which is formed in three steps, namely a tip which penetrates into the sleeve of the peg without substantial play, a medial zone with a ring which bears against the end face of the peg sleeve, and an abutment part with a ring which bears against the masonry or the like, e.g. a concrete wall, when the peg is knocked into position.

Further details of the invention are to be found in the following description of embodiments illustrated in the accompanying drawings.

In the drawings:

FIG. 2 is a tool in accordance with an embodiment of the invention for preparing a bore hole for the peg, in a condition before the hole is finished.

FIG. 3 illustrates, partly in section, the bore-preparing tool of FIG. 2 in an end position in which the bore hole has been finished, that is to say finish bored and provided with an enlargement.

FIG. 5 illustrates the commencement of the insertion of the peg of FIG. 1 into the finished bore hole of FIG. 3 by an implanting tool.

FIG. 6 is a side view, partly in section, of the finalising of the close fitting of the peg in the finished bore hole of FIG. 3.

Figure 7:
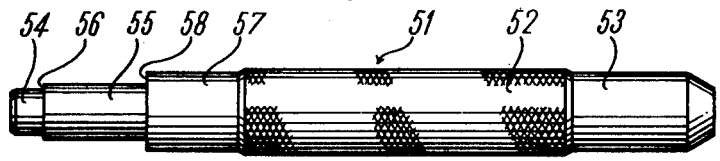

FIG. 7 gives, on a smaller scale, a side view of the complete implanting tool.

FIG. 8 illustrates the fastening of an object by means of the peg of FIG. 1, or the implanted peg of FIG. 5, and a threaded screw.

FIG. 9 is a side view, partly in section, of a bore-preparing tool in accordance with a further embodiment of the present invention involving an alternative method of producing the countersink in the bore hole.

FIG. 10 is, on a smaller scale, a side view of the tool of FIG. 9 shown orientated through 90°.

FIG. 11 is a front view of the tool taken in the direction of the arrow XI of FIG. 9.

FIG. 12 is a diagrammatic illustration of the front end of a boring tool for the production and simultaneous finishing of a bore hole for the peg, and FIG. 13 is a front view taken in the direction of the arrow XIII of FIG. 12.

Figures 1A, 1B:
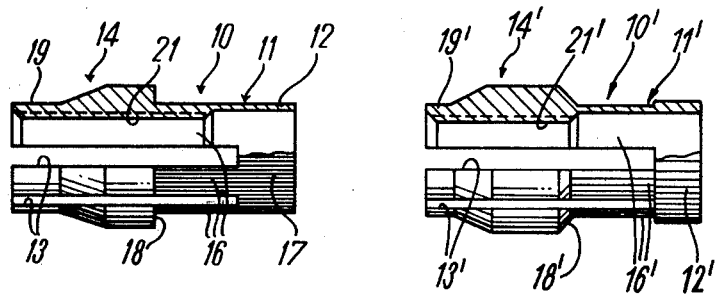
FIGS. 1a and 1b are, in each case, a side view partly in longitudinal section, of a peg in accordance with a preferred embodiment of the present invention.

The metallic peg 10 illustrated in FIG. 1a, intended for close fitted insertion in a correspondingly formed bore with countersunk annulus in a concrete wall or the like, comprises an integral piece only, namely a sleeve 11. This sleeve 11, which is illustrated in relaxed condition in FIG. 1a, is provided, from what will be defined at its leading end, up to the non-slotted trailing end or ring 12, with six longitudinal slots 13. The sleeve is thereby furnished with six segmental arms uniformly distributed around the periphery, and these can be compressed together, the longitudinal slots 13 being alike and of the same width and the arms being of a resilient nature, so as to contract the outer diameter of the sleeve. These segmental arms may be regarded as made up of a number of parts, namely a leading part 14 connected through bridge pieces 16 to the ring 12.

Whilst the ring 12 and the bridge pieces, which at the outer face are provided with longitudinal ribs 17 and corresponding grooves, are of the same outer diameter, the segmented leading part 14 is provided at the end adjoining the bridge pieces 16 with an annular shoulder 18 which constitutes the transition to the larger diameter of the leading part 14. The leading part 14 is approximately over half its axial length cylindrical, and adjoining that is provided peripherally with a conical section which tapers towards the other end to the outer diameter of the bridge pieces 16 and the ring 12, whereat it is adjoined by a segmented extension 19 which has a cylindrical outer diameter, for example that of the ring 12.

The sleeve 11 is provided with an inner thread 21 which extends from the free end of the extension 19 over the complete length of the leading part 14 and over a part of the length of the bridge pieces 16. The core radius of the inner thread 21 is less than the inner radius of the ring 12 by an amount which corresponds approximately to the depth of the thread. Because of the segmental form of the sleeve 11 in the zone of the inner thread 21 the inner thread 21 is of course interrupted in the peripheral direction by the longitudinal slots 13.

The peg 10' of the other preferred embodiment of the present invention illustrated in FIG. 1b is in essence constructed in the same way as the peg 10 of FIG. 1a; only the differences will therefore be pointed out, the same reference numerals being used but given a prime. The thickened cylindrical coaxial area of the leading part 14' not only here passes into a shorter segmented projection 19' but also tapers to the bridge pieces 16', the conical shoulder 18' however here being somewhat of steeper conical taper. Both the bridge pieces 16' and the ring 12' are circumferentially smooth but the ring 12' has a somewhat larger outer diameter which, instead of the previously superficial grooves, has a force fit in the basic borehole, (see below). Further the inner thread 21 is only provided in the zone of the leading end thickening and the extension 19'.

Reference will now be made to FIGS. 2 and 3 to introduce the production and form of a bore hole in masonry to receive the pegs. This is the blind hole 22 which initially is of the diameter of the pegs. As shown in these drawings it eventually will have leading and trailing sections, 23a and 23b respectively, with an enlarged countersunk section 24 between them, the countersink 24 has an abrupt change of width to form an annular shoulder 26 for the peg 10; it then extends over a cylindrical section which is axially longer than the corresponding zone of the leading part to a conically tapering zone which merges into the cylindrical bore section 23b. This enlargement 24, as will be shown later, is to accommodate the leading part 14 of the peg sleeve 11, the annular shoulder 18 of the latter being adapted to abut against the shoulder 26 of the bore; the ring 12 and the bridge pieces 16 are accommodated in the part 23a of the bore and the extension 19 in the part 23b of the bore without any substantial play, as is for example shown by FIG. 6. It will be understood that the bore enlargement and countersink will be correspondingly varied for the peg 10'.

Figure 4:
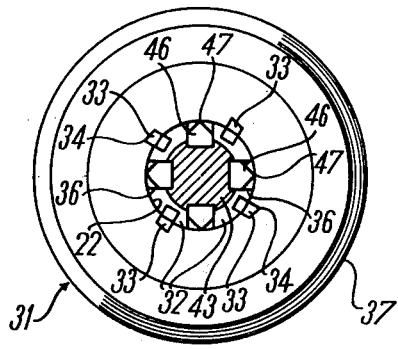
FIG. 4 is a section on the line IV—IV of FIG. 3.

A tool 31 for preparing a rough bore hole and finishing it is seen from FIGS. 2 to 4. The tool 31 in the embodiment illustrated has four primary cutter blades 33 which at their leading ends are secured by four arms 32 of spring steel which in assembly form a cylinder. These blades 33 are mounted on the ends of the arms 32, which are likewise segmental in cross section (see FIG. 4) in such a way that their cutting edges are disposed as in a lathe tool and project beyond the peripheral faces of the arms 32. The rest position of the resilient arms 32 is as illustrated in FIG. 2, that is to say the arms 32 which are of substantially the same thickness, are tapered, as seen in the direction of their length, from front to rear so as to produce slots 36 which taper conically towards the ends of the arms 32 provided with the primary cutter blades 33.

The arms 32 are secured to the rotatable part 37 of a stop 38 (FIG. 3). This stop 38 has a stationary annular part 39 on which the rotatable part 37 is mounted through an axial set of roller bearings 41. The axial attachment together of the two parts 37 and 39 is taken care of by an annular coupling 42 which engages behind the stationary part 29 and is screwed to the rotatable part 37. A driven tool spindle 43 is axially mounted in the fixed part 39 and is pushed and secured, at the end thereof adjacent the arms 32, in a shaft 44 secured to the rotatable part 37 for engagement in a boring machine or bore hammer.

The other end of the spindle 43 adjacent the primary cutter blades 33 is provided externally, in the example illustrated, with four secondary cutter blades 46, the cutting edges 47 of which extend axially and project substantially beyond the periphery of the spindle 43. These secondary blades 46 are arranged on the spindle engaged by the arms 32 in such a way that they extend in each case between the longitudinal slots 36 of the arms 32 and project beyond the outer peripheries of the arms 32 adjacent the stop 38 by an amount preferably of a few tenths of a millimeter, exceeding that of the rough bore 23' which has already been made. The width of the feet of the second cutter blades 46 corresponds to the width of the slots 36 in relation to the end of the arms 32 secured to the abutment 38. The arms 32 provided with the primary cutter blades 33 are of a length appropriate to the depth at which the peg is to be held in the masonry or the like. The length of the spindle provided with the secondary cutter blades 46 is correspondingly determined, as will be seen later, because the secondary cutter blades 46 have to be axially advanced into the zone of the primary cutter blades 33.

The production of a bore 22 for the peg 10, the implanting of the peg, and the fastening of an object by means of this peg are carried out as follows:

As shown in FIG. 2 a basic or rough bore 23' in the form of a blind hole of adequate depth is first of all made, this having a diameter which is a few tenths of a millimeter less than the minimum outer diameter of the sleeve 11 of the peg 10. The arms 32 of the tool 31 provided with the primary cutter blades 33 are inserted into this cylindrical rough bore 23' so that the fixed annular part 39 of the stop 38 abuts against the outer face of the concrete wall or the like concerned. The introduction of the arms 32 is made possible by the fact that in the rest position the outer diameter of these arms 32 over their complete length, is equal to or less than the inner diameter of the rough bore 23'. In the situation of the tool 31 illustrated the spindle 43 of this tool is retracted sufficiently for the secondary cutter blades 46 to project tightly into the rough bore 23'.

The machine or the like operating the spindle 31, for example a percussive drilling machine, can now be switched on so that the spindle 43 with the secondary cutter blades 46, and simultaneously also the arms 32, can rotate with the primary cutter blades 33, the arms 32 being impelled by the secondary cutter blades 46 which fit snugly between them. During the advance in the direction of arrow A of the cutter blades 46 with the spindle 43 the resilient arms 32 are forced outwardly from one another in the radial direction because the secondary cutter blades 46 engage between the tapering slots 36 and seek to open these. In the example illustrated the slots 36 are continuously conical over their complete length. As a consequence, with the advance not only is there a boring out of the rough hole 23' to a dimensionally accurate cylindrical bore 23a but in the same continuous way a milling or boring out of the rough hole 23' by the primary cutter blades 33 to produce the countersunk enlargement 24.

The linear correlation here between the boring out of the cylindrical bore part 23a and the production of the enlargement 24 can instead follow any required geometrical curve depending on the way in which the side faces of the arms 32 defining the slots 36 are formed. Thus for example the radial separation of the arms 32 with the primary cutter blades 33 may only commence later, for example when the secondary cutter blades 46 have already penetrated half way into the rough bore 23'. The rear cylindrical part 23b of the bore in which a leading conical part 48 of the spindle 43 located in advance of the cutter blades 46 has penetrated can remain in the rough condition, but it is also possible for the spindle 43 to be made sufficiently long and so driven that this cylindrical bore part 23 can also be widened somewhat to accommodate the extension 19 of the sleeve 11. The end of the boring out operation is illustrated in FIG. 3.

If the spindle 43 is now retracted again the arms 32 can spring back inwardly to their rest position, this being simplified by the fact that the leading corners of the edges 34 of the primary cutter blades 33 are inclined. Thus with this boring process first of all a dimensionally accurate cylindrical bore part 23a and, possibly also 23b, is produced and secondly the widening 24 of the bore is produced with a dimensionally accurate, rectangular radial resilient boring shoulder 26. After the arms 32 have sprung back the tool 31 can be taken out of the bore 22 again.

In accordance with FIG. 5 a peg 10 is inserted in the bore 22 compressed in the zone of the leading part 14 from its rest condition illustrated in FIG. 1 with its cylindrical inner cavity so that its outer diameter is reduced in the zone of the leading part 14 sufficiently to fit into the bore part 23a of the bore. To facilitate the introduction of the sleeve 11 into the bore 22 the transition from the projection 19 to the leading part 14 is made conical.

The implanting of the peg 10 is effected by means of a tool 51 of mandrel form, illustrated in FIG. 7, which is provided midway with a milled handle 52 and at one end with a knock-in pin 53. The other and leading end is provided with at least two steps giving a cylindrical tip 54 which fits into the ring 12 of the sleeve 11 and adjoins a medial part 55 of larger diameter. The annular shoulder of this medial part is applied against the end face of the ring 12 when the sleeve 11 enters the bore 22 and an adjoining abutment part 57 of larger diameter has an annular shoulder 58 which at the appropriate depth of insertion of the sleeve 11 into the bore 22, is applied against the outer face of the appropriate concrete wall or the like. In other words the medial part 55 is long enough for the abutment part 57 to come into contact with the masonry when the leading part 14 of the sleeve 11 is disposed in the zone of the enlargement 24 of the bore and has snapped back into the starting position illustrated in FIG. 1 and fits snugly into the enlargement 24. Axial tolerances can be accepted in this arrangement because, in view of the application of the leading part 14 and its annular shoulder 18 against the shoulder 26 of the bore 22 there is automatic fastening of an object by the peg 10.

After withdrawal of the implanted impact tool 51 fastening of an object 61 by means of the peg 10 snugly fitted into the bore 22 is effected by inserting an externally threaded screw 62, for example with the interposition of a washer 63, through a hole 64 in the object 61 into the bore 22 and screwing it into the inner threading 21 in the sleeve 11. This screw 62 is chosen sufficiently long to go through, possibly right through, the complete length of thread 21. A secure threaded engagement between the sleeve 11 and the screw 62 is ensured, even in the case of an enlargement 24 which has been made too large, because the extension 19 obstructs any further radial yielding of the segmental arms of the sleeve 11. When the screw 22 is turned the sleeve 11 is pulled outwards in the direction of arrow B so that the shoulder 18 of the leading part 14 bears automatically against the shoulder 26 in the bore 22. There is no radial force applied within the bore enlargement 24 and all the fastening effort is borne by the annular shoulder 26.

FIGS. 9 to 11 illustrate a further tool 31' for producing the widening 24 for the peg 10 in the bore, and this in conjunction with a modified rock drill 31" of FIGS. 12 and 13 is used instead of a usual rock drill and the tool 31. Tool 31' differs from the tool 30 primarily in the fact that the secondary cutter blades are here omitted and instead are replaced by secondary cutter edges 46' on the rock drill. In addition the tool 31', as shown in FIG. 11, has only two diametrically opposed primary cutter blades 31' for producing the enlargement 24, and these are secured on arms 32' of spring steel. These arms 32' are, in the rest position as shown in FIGS. 3 and 9, provided at their leading ends, at which the primary cutter blades 33' are arranged, bent progressively inwards.

The arms 32' take the form of lugs of rectangular cross section of a width corresponding to that of the primary cutter blades 33'. The two diametrically opposed arms 32' lie in the grooves 49 at the leading ends of the driven tool spindle 43'. The bases of the two grooves 49 extend conically towards one another in the direction of the leading end in accordance with the shape of the leading end of the arms 32. This engagement of arms 32 in the grooves 49 produces the non-rotational coupling between spindle 43 and the arms provided with the primary cutter blades 33'. The tool shank 44' bears against the stop 38 through a compression spring 50. In this tool the spindle 43' with the arms 32' is pushed into the finished bore 23 up to the stop 38. When the spindle 43' is rotated there is a radial spreading of the primary cutter blades 33' under the pressure of the shank 44' against the spring 50 because the conical leading end 48' pushes the arms 32 apart. The end positions of the primary cutter blades 33' are indicated in dotted lines in FIG. 11. In this connection it is further noted that the edges of the primary cutter blades 33' which extend axially are provided with notches 66 which help comminution of the concrete.

The rock drill 31" is developed from a normal rock drill which is provided at its leading tip with cutters 67 which, as shown in plan in FIG. 13, are offset relatively to the longitudinal medial axis and also have notches 66' to provide easier cutting of the concrete. This rock drill 31" however is provided behind (as regarded in the direction of feed) the cutter blades 64 which extend obliquely in the axial direction, with two diametrically opposed secondary cutter blades or edges 66' corresponding to the two cutter blades 46 of the tool 31 illustrated in FIG. 2 et seq. These secondary cutter blades 46 cater for boring out as a kind of frictional cavitation of the rough bore 23' and thus a dimensionally accurate production of the bore. Because of these secondary cutter blades 46 the bore 23 is of a more aggreeable roundness. In this embodiment it is sufficient for the outer diameter of the secondary cutter blades 46' to correspond to the leading cutters 67. These secondary cutter blades 46' not only serve, so to speak, for paring of the rough bore to accurate dimensions, but also for the guidance of the rock drill 31". It will be understood that the production of the bore 23 with the rock drill 31" precedes the production of the countersink in the bore 23 with the tool 31'.

I claim:

1. A peg for implantation in a bore in a masonry, brickwork and the like, which bore is provided internally with a radial enlargement, said peg comprising an axially elongated sleeve having an inner thread for receiving a fastening screw and said sleeve having a leading end arranged to be inserted first into the bore and a trailing end, said sleeve comprising a leading part longitudinally slotted from the leading end to provide a plurality of axially extending segments separated by axial slots terminating between said leading end and trailing end, a trailing annular part extending from the end of said slots closer to said trailing end toward said trailing end, said sleeve having a relaxed condition and a flexed condition where said segments are compressed radially inwardly from the relaxed condition, said leading part having a greater outside diameter, in the relaxed condition than said adjoining trailing annular part of the sleeve, the outside diameter of said leading part being variable in the flexed condition to enable said segments forming said leading part to be pushed into the bore and to be released into the relaxed condition and snapped into the enlargement in the bore to inhibit withdrawal of the peg from the bore, characterized therein that the annular trailing part and the leading part of the sleeve are integral and the leading part is provided externally and segmentally with an axially extending annular radially thickened section, said leading part of the sleeve is provided integrally at the leading end toward the radially thickened section with an axially extending cylindrically shaped extension segmented by the axial slots, the outer diameter of said extension in the relaxed condition being equal to the diameter of the annular trailing part and being less than the diameter of said radially thickened section, and that the said inner thread is provided in the axial region of the leading part including the extension of the sleeve, and in its relaxed condition, said sleeve is of substantially the same inner diameter over the complete axial length thereof, said segments of the leading part are integrally connected through bridge pieces with a ring forming at least part of the trailing part, and the leading part merges into the bridge pieces through a steep radially inwardly directed conical taper.

2. A peg according to claim 1, characterised by the fact that the bridge pieces and the ring are provided externally with longitudinally-extending groove-forming ribs.

* * * * *

UNITED STATES PATENT AND TRADEMARK OFFICE
CERTIFICATE OF CORRECTION

PATENT NO. : 4,449,877
DATED : May 22, 1984
INVENTOR(S) : Juergen Kessler

It is certified that error appears in the above-identified patent and that said Letters Patent is hereby corrected as shown below:

On the title page change:

"[73]   Assignee: Hilti Aktiengesellschaft, Fed.Rep. of Germany" to
-- [73]   Assignee: Hilti Aktiengesellschaft, Fürstentum Liechtenstein --.

Signed and Sealed this

Twenty-third Day of October 1984

[SEAL]

Attest:

GERALD J. MOSSINGHOFF

*Attesting Officer*      *Commissioner of Patents and Trademarks*